United States Patent
Sirotkin et al.

(10) Patent No.: US 9,906,983 B2
(45) Date of Patent: *Feb. 27, 2018

(54) APPARATUS, SYSTEM AND METHOD OF PROVIDING OFFLOADABILITY INFORMATION TO A USER-EQUIPMENT (UE)

(71) Applicant: INTEL IP CORPORATION, Santa Clara, CA (US)

(72) Inventors: Alexander Sirotkin, Giv'on Hachadasha (IL); Alexandre S. Stojanovski, Paris (FR); Vivek Gupta, San Jose, CA (US); Chen-Ho Chin, Deerlijk (BE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,039

(22) Filed: Sep. 21, 2014

(65) Prior Publication Data
US 2015/0195743 A1 Jul. 9, 2015

Related U.S. Application Data

(60) Provisional application No. 61/924,194, filed on Jan. 6, 2014.

(51) Int. Cl.
*H04W 28/08* (2009.01)
*H04W 36/00* (2009.01)
(Continued)

(52) U.S. Cl.
CPC ....... *H04W 28/08* (2013.01); *H04W 36/0022* (2013.01); *H04W 36/0027* (2013.01);
(Continued)

(58) Field of Classification Search
CPC . H04W 28/08; H04W 36/14; H04W 36/0027; H04W 36/0022; H04W 84/12; H04W 88/06
See application file for complete search history.

(56) References Cited

U.S. PATENT DOCUMENTS

2011/0058479 A1 3/2011 Chowdhury
2011/0222523 A1 9/2011 Fu et al.
(Continued)

FOREIGN PATENT DOCUMENTS

JP 2013102334 5/2013
JP 2013522986 6/2013
(Continued)

OTHER PUBLICATIONS

International Search Report and Written Opinion for International Application No. PCT/US2015/010295, dated Apr. 23, 2015, 11 pages.
(Continued)

*Primary Examiner* — Walter Divito
(74) *Attorney, Agent, or Firm* — Shichrur & Co.

(57) ABSTRACT

Some demonstrative embodiments include devices, systems and methods of providing offloadability information to a User Equipment (UE). For example, a core network (CN) may provide to the UE Packet Data Network (PDN) offloadability information corresponding to one or more PDN connections of the UE, the PDN offloadability information indicating which PDN connection of the one or more PDN connections is able to be offloaded to a Wireless Local Area Network (WLAN).

25 Claims, 5 Drawing Sheets

(51) Int. Cl.
H04W 36/14 (2009.01)
H04W 84/12 (2009.01)
H04W 88/06 (2009.01)

(52) U.S. Cl.
CPC ............ *H04W 36/14* (2013.01); *H04W 84/12* (2013.01); *H04W 88/06* (2013.01)

(56) References Cited

U.S. PATENT DOCUMENTS

| | | |
|---|---|---|
| 2014/0016629 A1 | 1/2014 | Pancorbo Marcos et al. |
| 2014/0161026 A1 | 6/2014 | Stojanovski et al. |
| 2014/0211626 A1 | 7/2014 | Liu |

FOREIGN PATENT DOCUMENTS

| | | |
|---|---|---|
| KR | 20130130066 | 11/2013 |
| RU | 2012123966 | 12/2013 |
| WO | 2011/129107 | 10/2011 |
| WO | 2012/108660 | 8/2012 |
| WO | 2012119119 | 9/2012 |
| WO | 2012149954 | 11/2012 |
| WO | 2012177023 | 12/2012 |
| WO | 2013040978 | 3/2013 |
| WO | 2013042330 | 3/2013 |

OTHER PUBLICATIONS

3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013; 209 pages.
3GPP TS 36.331 V11.5.0 (Sep. 2013); Technical Specification; 3rd Generation Partnership Project; Technical Specification Group Radio Access Network; Evolved Universal Terrestrial Radio Access (E-UTRA); Radio Resource Control (RRC); Protocol specification (Release 11); Sep. 2013; 347 pages.
3GPP TS 36.304 V11.5.0 (Sep. 2013); Technical Specification; 3rd Generation Partnership Project; Technical Specification Group Radio Access Network; Evolved Universal Terrestrial Radio Access (E-UTRA); User Equipment (UE) procedures in idle mode; (Release 11); Sep. 2013; 34 pages.
3GPP TS 24.008 V12.4.0 (Dec. 2013); Technical Specification; 3rd Generation Partnership Project; Technical Specification Group Core Network and Terminals; Mobile radio interface Layer 3 specification; Core network protocols; Stage 3 (Release 12); Dec. 2013; 54 pages.
3GPP TS 24.301 V12.3.0 (Dec. 2013); Technical Specification; 3rd Generation Partnership Project; Technical Specification Group Core Network and Terminals; Non-Access-Stratum (NAS) protocol for Evolved Packet System (EPS); Stage 3 (Release 12); Dec. 2013; 353 pages.
3GPP TS 23.401 V12.3.0 (Dec. 2013); Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 12); Dec. 2013; 302 pages.
3GPP TS 25.304 V11.4.0 (Sep. 2013); Technical Specification; 3rd Generation Partnership Project; Technical Specification Group Radio Access Network; User Equipment (UE) procedures in idle mode and procedures for cell reselection in connected mode (Release 11); Sep. 2013; 54 pages.
3GPP TS 23.402 V12.3.0 (Dec. 2013); Technical Specification; 3rd Generation Partnership Project; Technical Specification Group Services and System Aspects; Architecture enhancements for non-3GPP accesses (Release 12); Dec. 2013; 288 pages.
S2-142260; SA WG2 Meeting #103; May 19-23, 2014, Phoenix, Arizona, USA; (revision of S2-142164); "Traffic steering for RAN-based WLAN interworking solution"; 25 pages.
Office Action for U.S. Appl. No. 14/871,499, dated Apr. 8, 2016, 21 pages.
International Preliminary Report on Patentability for PCT/US2015/010295, dated Jun. 24, 2016, 19 pages.
Office Action for U.S. Appl. No. 14/871,499 dated Aug. 4, 2016, 23 pages.
Office Action for Japanese Patent Application No. 2016-538661, dated Jun. 13, 2017, 9 pages (Including 4 pages of English translation).
3GPP TR 23.829 V10.0.0, (Mar. 2011) 3rd Generation Partnership Project; Technical Specification Group Service and System Aspects; Local IP Access and Selected IP Traffic Offload (LIPA-SIPTO) (Release 10) Mar. 2011, 9 pages.
C.B.Sankaran, Data Offloading Techniques in 3GPP Rel-10 networks: A tutorial, IEEE Communications Magazine Jun. 6, 2012, vol. 50, Issue: 6, 9 pages.
Office Action for Korean Patent Application No. 10-2016-7014937 dated Feb. 20, 2017, 9 pages (Including 4 pages of English translation).
Office Action for U.S. Appl. No. 14/871,499, dated Feb. 28, 2017, 23 pages.
European Search Report for European Patent Application No. 15733124.0 dated Apr. 28, 2017, 8 pages.
Office Action for Australian Patent Application No. 2015203907, dated May 12, 2017, 5 pages.
Notice of Allowance for Russian Patent Application No. 2016122302/07, dated May 19, 2017, 11 pages.
Advisory Action for U.S. Appl. No. 14/871,499, dated Nov. 1, 2016, 6 pages.
Notice of Allowance for U.S. Appl. No. 14/871,499, dated Jul. 5, 2017, 13 pages.
Office Action for Australian Patent Application No. 2015203907, dated Dec. 14, 2017, 7 pages.

APPARATUS, SYSTEM AND METHOD OF PROVIDING OFFLOADABILITY INFORMATION TO A USER-EQUIPMENT (UE)

CROSS REFERENCE

This application claims the benefit of and priority from U.S. Provisional Patent Application No. 61/924,194 entitled "Advanced Wireless Communication Systems and Techniques", filed Jan. 6, 2014, the entire disclosure of which is incorporated herein by reference.

TECHNICAL FIELD

Some embodiments described herein generally relate to providing offloadability information to a User Equipment (UE).

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

There exists a need for solutions to enhance a level of cooperation and/or integration between WLAN and cellular networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
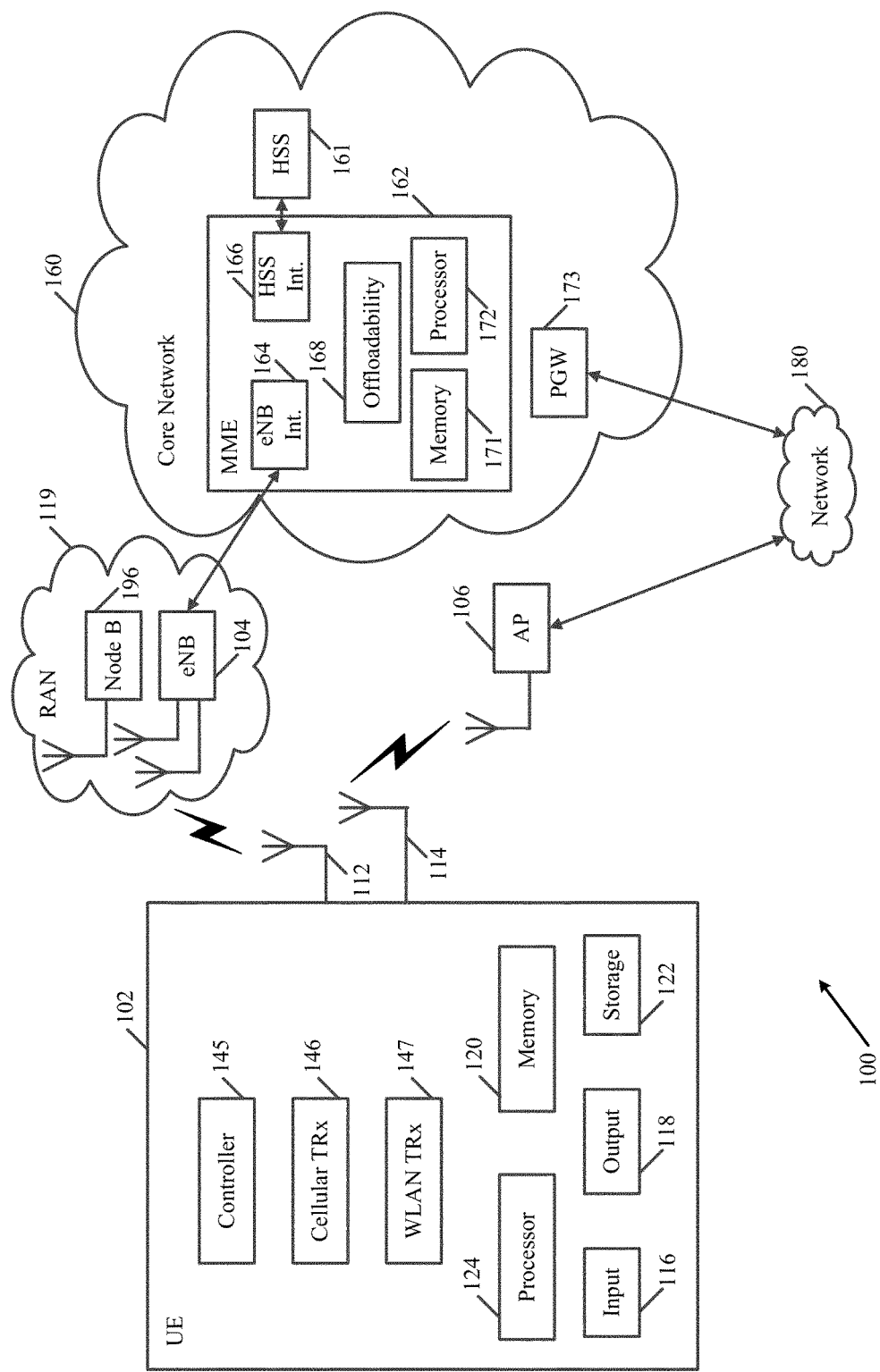
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.300 (*3GPP TS* 36.300 *V*11.7.0 (2013-09);

Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)); 3GPP TS 36.331 (3*GPP TS* 36.331 *V*11.5.0 (2013-09); *Technical Specification; 3rd Generation Partnership Project; Technical Specification Group Radio Access Network; Evolved Universal Terrestrial Radio Access (E-UTRA); Radio Resource Control (RRC); Protocol specification (Release* 11)); 3GPP TS 36.304 (3*GPP TS* 36.304 *V*11.5.0 (2013-09); *Technical Specification; 3rd Generation Partnership Project; Technical Specification Group Radio Access Network; Evolved Universal Terrestrial Radio Access (E-UTRA); User Equipment (UE) procedures in idle mode*; (*Release* 11)); 3GP TS 24.008 (3*GPP TS* 24.008 *V*12.4.0 (2013-12); *Technical Specification; 3rd Generation Partnership Project; Technical Specification Group Core Network and Terminals; Mobile radio interface Layer* 3 *specification; Core network protocols; Stage* 3 (*Release* 12)); 3GPP TS 24.301 (3*GPP TS* 24.301 *V*12.3.0 (2013-12); *Technical Specification; 3rd Generation Partnership Project; Technical Specification Group Core Network and Terminals; Non-Access-Stratum (NAS) protocol for Evolved Packet System (EPS); Stage* 3 (*Release* 12)); 3GPP TS 23.401 (3*GPP TS* 23.401 *V*12.3.0 (2013-12); *Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release* 12)); 3GPP TS 25.304 (3*GPP TS* 25.304 *V*11.4.0 (2013-09); *Technical Specification; 3rd Generation Partnership Project; Technical Specification Group Radio Access Network; User Equipment (UE) procedures in idle mode and procedures for cell reselection in connected mode (Release* 11)); and 3GPP TS 23.402 (3*GPP TS* 23.402 *V*12.3.0 (2013-12); *Technical Specification; 3rd Generation Partnership Project; Technical Specification Group Services and System Aspects; Architecture enhancements for non-*3*GPP accesses (Release* 12))), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e*, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMax cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums, for example, a radio channel, a cellular channel, an RF channel, a Wireless Fidelity (WiFi) channel, an IR channel, and the like, e.g., as described below. One or more elements of system 100 may optionally be capable of communicating over any suitable wired communication links.

In some demonstrative embodiments, system 100 may include at least one User Equipment (UE) 102 capable of communicating with one or more wired networks 180 via at least one Radio Access Network (RAN) 119, and/or at least one non-cellular network, e.g., as described below.

In some demonstrative embodiments, networks 180 may include one or more Packet Data Networks (PDNs). For example, networks 180 may include an Internet network, an IP Multimedia Core Network Subsystem (IMS) network, and/or any other PDN. In other embodiments, networks 180 may include any other suitable additional and/or alternative network.

In some demonstrative embodiments, RAN 119 may include one or more cells controlled by one or more cellular nodes ("nodes"). For example, RAN 119 may include an evolved Node B (eNB) 104, a Node B 196, and/or any other cellular node, e.g., a Base Station (BS), a Base Transceiver Station (BTS), and the like.

In some demonstrative embodiments, eNB 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In some demonstrative embodiments, system 100 may also include a Core Network (CN or CNW) 160, which may be configured to provide one or more services to UE 102, and/or to setup and/or manage communication between UE 102 and RAN 119 and/or networks 180, e.g., as described below.

In some demonstrative embodiments, CN 160 may include one or more PDN Gateways (PGWs) 173 to support a PDN connection between UE 102 and a PDN of network 180.

In some demonstrative embodiments, a PGW 173 may be associated with an Access Point Name (APN). UE 102 may utilize the APN of a PGW 173, for example, to facilitate a connection to network 180 via the PGW 173.

In some demonstrative embodiments, core network 160 may include a mobility manager, e.g., a Mobility Management Entity (MME) 162, to manage one or more mobility-related aspects of a mobility of UE 102 between Radio Access Technology (RAT) networks, e.g., as described below.

In some demonstrative embodiments, MME 162 may include one or more interfaces to interface between MME 162 and one or more other elements of system 100, e.g., as described below.

In some demonstrative embodiments, MME 162 may include an eNB interface 164 to communicate with eNB 104, e.g., as described below. For example, eNB interface 164 may include an S1-MME interface to communicate with eNB 104 according to an S1 Application protocol (AP) (S1AP).

In some demonstrative embodiments, MME 162 may include a Home Subscriber Server (HSS) interface 166 to communicate with an HSS 161, e.g., as described below. For example, HSS interface 166 may include a S6 interface, or any other interface.

In some demonstrative embodiments, system 100 may include a non-cellular network, for example, a WLAN, e.g., a Basic Service Set (BSS), managed by an Access Point (AP) 106.

In some demonstrative embodiments, the non-cellular network may at least partially be within a coverage area of RAN 119. For example, AP 106 may be within a coverage area of eNB 104.

In some demonstrative embodiments, UE 102 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, eNB 104, AP 106, and/or Node B 196 may include one or more wireless communication units to perform wireless communication between UE 102, RAN 119, AP 106 and/or with one or more other wireless communication devices, e.g., as described below.

In some demonstrative embodiments, UE 102 may include a cellular Transceiver (TRx) 146 to communicate with RAN 119, and a WLAN TRx 147 to communicate with AP 106.

In some demonstrative embodiments, cellular TRx 146 and/or WLAN TRx 147 may include, or may be associated with, one or more antennas. In one example, UE 102 may include at least two antennas, e.g., antennas 112 and 114, or any other number of antennas, e.g., one antenna or more than two antennas.

In some demonstrative embodiments, antennas 112, and/or 114 may include any type of antennas suitable for transmitting and/or receiving wireless communication signals, blocks, frames, transmission streams, packets, messages and/or data. For example, antennas 112 and/or 114 may include any suitable configuration, structure and/or arrangement of one or more antenna elements, components, units, assemblies and/or arrays. For example, antennas 112 and/or 114 may include a phased array antenna, a dipole antenna, a single element antenna, a set of switched beam antennas, and/or the like.

In some embodiments, antennas 112 and/or 114 may implement transmit and receive functionalities using separate transmit and receive antenna elements. In some embodiments, antennas 112 and/or 114 may implement transmit and receive functionalities using common and/or integrated transmit/receive elements.

In some demonstrative embodiments, cellular TRx 146 and/or WLAN TRx 147 may include one or more wireless transmitters, receivers and/or transceivers able to send and/or receive wireless communication signals, RF signals, frames, blocks, transmission streams, packets, messages, data items, and/or data.

In some demonstrative embodiments, WLAN TRx 147 may be configured to communicate with AP 106 over a WLAN link, and cellular transceiver 146 may be configured to communicate with RAN 119 over a cellular link.

In some demonstrative embodiments, the WLAN link may include, for example, a Wireless Fidelity (WiFi) link, a Wireless Gigabit (WiGig) link, or any other link. In some demonstrative embodiments, the WLAN link may include, for example, a link over the 2.4 Gigahertz (GHz) or 5 GHz frequency band, the 60 GHz frequency band, or any other frequency band.

In some demonstrative embodiments, cellular TRx 146 may include a multiple input multiple output (MIMO) transmitters receivers system (not shown), which may be capable of performing antenna beamforming methods, if desired. In other embodiments, cellular TRx 146 may include any other transmitters and/or receivers.

In some demonstrative embodiments, cellular TRx 146 may include a turbo decoder and/or a turbo encoder (not shown) for encoding and/or decoding data bits into data symbols, if desired. In other embodiments, cellular TRx 146 may include any other encoder and/or decode.

In some demonstrative embodiments, cellular TRx 146 may include OFDM and/or SC-FDMA modulators and/or demodulators (not shown) configured to communicate OFDM signals over downlink channels, e.g., between RAN 119 and UE 102, and SC-FDMA signals over uplink channels, e.g., between UE 102 and RAN 119. In other embodiments, cellular TRx 146 may include any other modulators and/or demodulators.

In some demonstrative embodiments, WLAN TRx 147 may establish a WLAN link with AP 106. For example, WLAN TRx 147 may perform the functionality of one or more STAs, e.g., one or more WiFi STAs, WLAN STAs, and/or millimeter Wave (mmWave) STAs. The WLAN link may include an uplink and/or a downlink. The WLAN downlink may include, for example, a unidirectional link from AP 106 to the one or more STAs. The uplink may include, for example, a unidirectional link from a STA to AP 106.

In some demonstrative embodiments, UE 102 may also include, for example, one or more of a processor 124, an input unit 116, an output unit 118, a memory unit 120, and a storage unit 122. UE 102 may optionally include other suitable hardware components and/or software components. In some demonstrative embodiments, some or all of the components of UE 102 may be enclosed in a common housing or packaging, and may be interconnected or operably associated using one or more wired or wireless links.

In some demonstrative embodiments, MME 162 may also include, for example, a processor 172 and/or a memory unit 171. MME 162 may optionally include other suitable hardware components and/or software components. In some demonstrative embodiments, some or all of the components of MME 162 may be enclosed in a common housing or packaging, and may be interconnected or operably associated using one or more wired or wireless links. In other embodiments, components of MME 162 may be distributed among multiple or separate devices.

Processor 124 and/or processor 172 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102 and/or of one or more suitable applications. Processor 172 executes instructions, for example, of an Operating System (OS) of MME 162 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102. Memory unit 171 may store, for example, data processed by MME 162.

In some demonstrative embodiments, UE 102 may be configured to utilize a cellular connection, e.g., a Long Term Evolution (LTE) cellular connection, a Universal Mobile Telecommunications System (UMTS) connection or any other cellular connection, to communicate with RAN 119, and a WLAN connection, e.g., a Wireless-Fidelity (WiFi) connection or any other WLAN connection, to communicate with AP 106.

In some demonstrative embodiments, cellular TRx 146 utilize the cellular link between UE 102 and RAN 119 to communicate traffic of one or more PDN connections, e.g., via one or more PGWs 173.

In some demonstrative embodiments, UE 102 may establish one or more bearers, e.g., one or more Evolved Packet-switched System (EPS) bearers, via the one or more PDN connections between UE 102 and one or more PGWs 173.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, utilizing the WLAN connection as a default connection, e.g., as long as UE 102 receives from AP 106 a strong enough signal, may result in an increase in the congestion of the WLAN, e.g., if a large number of UEs simultaneously connect to the same AP, which in turn may result in a decrease of throughput over the WLAN connection between UE 102 and AP 106.

In some demonstrative embodiments, system 100 may be configured to enable selective connection of UE 102 to the WLAN or the cellular network, for example, based on one or more criteria and/or parameters, e.g., as described in detail below.

In some demonstrative embodiments, the selective connection between UE 102 and RAN 119 and/or AP 106 may enable, for example, load balancing between the WLAN and the cellular network.

In some demonstrative embodiments, UE 102 may be configured to facilitate a UE-centric (also referred to as "UE controlled") access network selection scheme, in which UE 102 may select an access network to be utilized by UE 102.

In some demonstrative embodiments, UE 102 may include a controller 145 to control one or more functionalities of UE 102 and/or to control one or more communications performed by UE, for example, to steer traffic between the WLAN and RAN 119, e.g., as described below.

In some demonstrative embodiments, controller 145 may include or may be implemented using suitable circuitry, e.g., controller circuitry, scheduler circuitry, processor circuitry, memory circuitry, and/or any other circuitry, which may be configured to perform at least part of the functionality of controller 145. Additionally or alternatively, one or more functionalities of controller 145 may be implemented by logic, which may be executed by a machine and/or one or more processors, e.g., as described below.

In some demonstrative embodiments, cellular TRx 146 may receive RAN assistance information from RAN 119. The RAN assistance information may include, for example, information configured to assist the UE-centric access network selection at UE 102.

In some demonstrative embodiments, the RAN assistance information may include, for example, offload preference information; one or signal strength thresholds, for example, one or more cellular thresholds, e.g., including a Reference Signal Received Power (RSRP) threshold, a Received Signal Code Power (RSCP) threshold, and/or any other threshold; and/or any other threshold, parameter and/or assistance information.

In some demonstrative embodiments, cellular TRx 146 may receive the RAN assistance information via Radio Resource Control (RRC) signaling, e.g., from eNB 104, and/or via any other message.

In some demonstrative embodiments, controller 145 may make a traffic steering decision, for example, to steer traffic from a PDN connection, e.g., via RAN 119, to a WLAN connection, and/or from the WLAN connection back to the PDN connection, for example, using the RAN assistance information, e.g., as described below.

In some demonstrative embodiments, one or more PDN connections ("the offloadable PDN connections") may be offloaded to WLAN, while one or more other PDN connections ("the non-offloadable PDN connections") may not be offloaded to WLAN. For example, an operator, e.g., of CN 160, may define, which PDN connections may be offloaded to WLAN, and/or which PDN connections may not be offloaded to WLAN, e.g., based on any criteria.

In some demonstrative embodiments, information regarding, which PDN connection may be offloaded to WLAN, and which PDN connection is not to be offloaded to WLAN, may be provided to UE 102, for example, via RAN 119, e.g., as described below.

In some demonstrative embodiments, cellular TRx 146 may receive offloadability information from RAN 119, e.g., as described below.

In some demonstrative embodiments, the ability to provide the offloadability information to UE 102 via RAN 119 may enable an efficient implementation of a UE-centric traffic steering scheme, for example, even if other messaging mechanism are not utilized, e.g., an Access network discovery and selection function (ANDSF) mechanism.

In some demonstrative embodiments, the offloadability information may indicate which PDN connection of the one or more PDN connections, which are utilized by UE 102, is able to be offloaded to the WLAN; and/or which PDN connection of the one or more PDN connections, which are utilized by UE 102, is not to be offloaded to the WLAN, e.g., as described below.

In some demonstrative embodiments, the offloadability information may indicate for a PDN connection, e.g., for each PDN connection, whether or not the PDN connection is offloadable to the WLAN, e.g., as described below.

In some demonstrative embodiments, cellular TRx 146 may receive the offloadability information via Non-Access Stratum (NAS) signaling, e.g., as described below.

In some demonstrative embodiments, cellular TRx 146 may receive the offloadability information via NAS signaling from MME 162, e.g., as described below.

In other demonstrative embodiments, cellular TRx 146 may receive the offloadability information via any other message and/or from any other element of CN 160, for example, RRC signaling, e.g., as described below.

In some demonstrative embodiments, controller 145 may offload traffic of at least one PDN connection to the WLAN based on the RAN assistance information and the offloadability information, e.g., as described below.

In some demonstrative embodiments, controller 145 may be configured to steer traffic between RAN 119 and the WLAN at an APN granularity and/or resolution. For example, if controller 145 selects to steer a traffic flow of a PDN corresponding to an APN to or from the WLAN, controller 145 may also steer all other traffic flows and/or traffic bearers of the APN to or from the WLAN.

Figure 2:
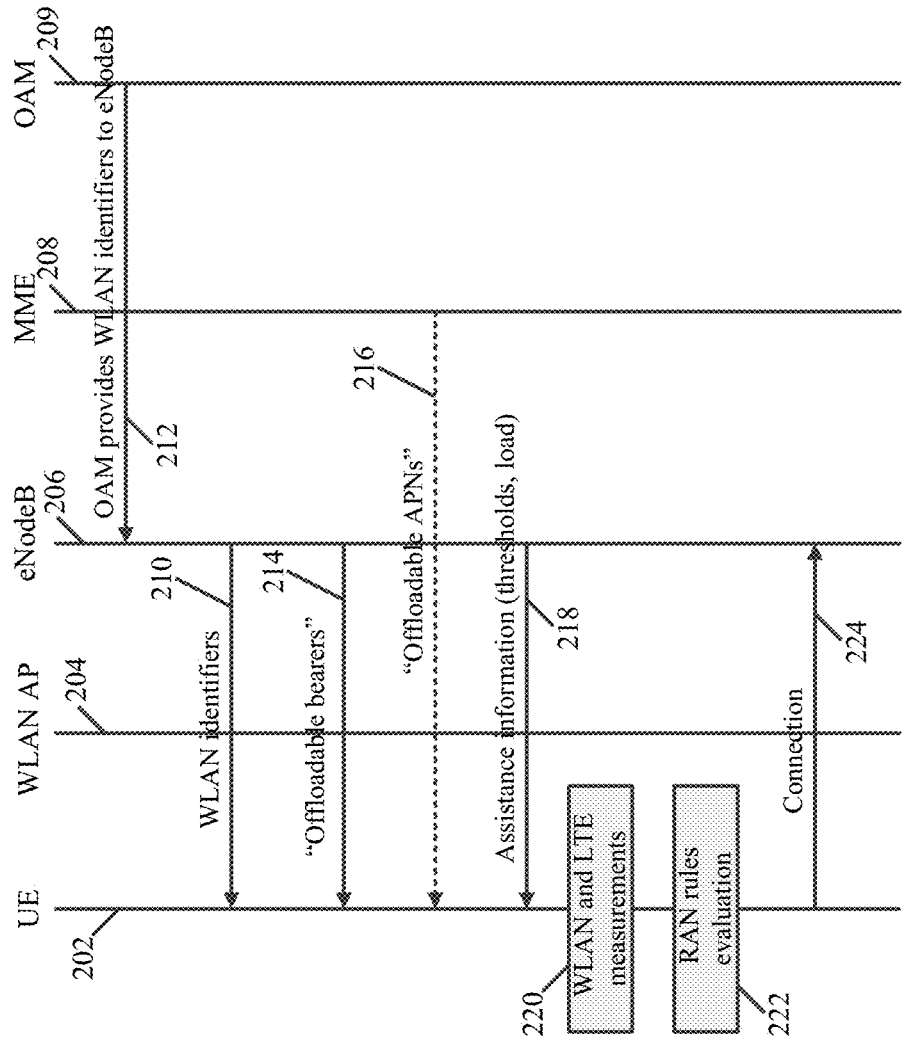
FIG. 2 is a schematic illustration of a sequence diagram of operations performed by a User Equipment (UE), a Wireless Local Area Network (WLAN) Access Point (AP), a Node, and a Core Network (CN), in accordance with some demonstrative embodiments.

Reference is mad to FIG. 2, which illustrates a sequence diagram of operations performed by UE 202, a WLAN AP 204, an eNB 206, and a CN 208, in accordance with some demonstrative embodiments. In some demonstrative embodiments, UE 202 may perform the functionality of UE 102 (FIG. 1), WLAN AP 204 may perform the functionality of AP 106 (FIG. 1), eNB 206 may perform the functionality of eNB 104 (FIG. 1), and/or CN 208 may perform the functionality of one or more elements of CN 160 (FIG. 1).

In some demonstrative embodiments, UE 202 may receive one or more WLAN identifiers 210 of one or more WLANs, e.g., an identifier of WLAN AP 204.

In some demonstrative embodiments, WLAN identifiers 210 may be provided to UE 202 by RAN 119 (FIG. 1), e.g., via RRC signaling. For example, eNB 206 may send to UE 202 an RRC signaling message including the WLAN identifiers 210. In one example, eNB 206 may receive (208) the WLAN identifiers from an Operations, Administration and Management (OAM) element 209, or from any other source.

In some demonstrative embodiments, UE 202 may receive offloadability information to indicate which PDN connections and/or which APNs may be offloaded to WLAN, e.g., as described below.

In some demonstrative embodiments, UE 202 may receive the offloadability information from CN 208, for example, via NAS signaling 216, e.g., from MME 162 (FIG. 1), e.g., as described below.

In some demonstrative embodiments, UE 202 may receive the offloadability information from eNB 206, for example, via RRC signaling 214, e.g., as described below.

In some demonstrative embodiments, UE 202 may receive RAN assistance information 218, e.g., from RAN 119 (FIG. 1). For example, eNB 206 may send the RAN assistance information, e.g., via RRC signaling directed to UE 202, broadcast messages, and the like.

In some demonstrative embodiments, the WLAN identifier 210, the offloadability information, and the RAN assistance information may be communicated according to the order shown in FIG. 2. In other embodiments, the WLAN identifier 210, the offloadability information, and the RAN assistance information may be communicated according to any other different order.

In some demonstrative embodiments, UE 202 may perform one or more measurements (220), for example, measurements corresponding to RAN 119 (FIG. 1) and/or measurements corresponding to WLAN AP 204, e.g., signal strength measurements, throughput measurements, link condition measurements, and the like.

In some demonstrative embodiments, UE 202 may evaluate (222) one or more rules to make a traffic steering decision with respect to one or more PDN connections. The one or more rules may include, for example, one or more RAN rules, e.g., received from RAN 119 (FIG. 1).

In some demonstrative embodiments, the rules may include one or more rules configured to select to steer traffic to the WLAN or to the RAN, for example, based on the one or more measurement and the RAN assistance information. For example, controller 145 (FIG. 1) may evaluate one or more RAN rules from RAN 119 (FIG. 1), for example, based on a comparisons between a plurality of measurements and a plurality of thresholds, e.g., as received in the RAN assistance information.

In one example, UE 202 may evaluate one or more of the following rules, and/or one or more other rules, for example, when UE 202 is camped on a node of RAN 119 (FIG. 1), e.g., eNB 206, and UE 202 detects at least one WLAN AP 204:

```
if (measured_metric_A < threshold_A1) && (measured_metric_B >
threshold_B1) && (measured_metric_C < threshold_C1 {
    steerTrafficToWLAN( );
} else {
    steerTrafficTo3GPP( );
}
``` wherein, for example, the measured_metric_A may include a measured cellular signal strength, e.g., a measured RSRP/RSRQ for LTE, or a measured RSCP for UMTS; the threshold_A1 may include, for example, a threshold corresponding to the measured_metric_A; the measured_metric_B may include a measurement of a WLAN signal strength, e.g., an RSSI; the threshold_B1 may include, for example, a threshold corresponding to the measured_metric_B; and/or the measured_metric_C may include a measurement of a WLAN parameter, e.g., a WLAN BSS load, a WLAN backhaul load, or any other WLAN parameter; the threshold_C1 may include, for example, a threshold corresponding to the measured_metric_C. The thresholds threshold_A1, threshold_B1, and/or threshold_C1 may be provided, for example, as part of RAN assistance information 218.

In some demonstrative embodiments, UE 202 may select whether or not to offload traffic of one or more PDNs, which have been indicated as offloadable, based on the one or more rules. For example, UE may select to offload the one or more offloadable PDN connections to WLAN AP 204, e.g., if evaluation of the rules results in a "true" result. The UE may select, for example, not to offload the one or more offloadable PDN connections and/or to move one or more PDN connections back from WLAN AP 206 to the RAN, e.g., if evaluation of the rules results in a "false" result.

In some demonstrative embodiments, UE 202 may selectively move (224) traffic of the offloadable PDN connections, e.g., traffic of all PDN connections belonging to an offloadable APN, based on the evaluation of the rules. For example, UE 202 may move the traffic of the offloadable PDN connections to WLAN AP 204, e.g., using WLAN Control Protocol (WLCP) signaling, for example, if the evaluation of the rules indicates that traffic should be steered to the WLAN. The UE 202 may move the traffic of offloadable PDN connections, which have been previously moved to WLAN AP 204, back to the Ran, for example, if the evaluation of the rules indicates that traffic should not be steered to the WLAN.

Referring back to FIG. 1, in some demonstrative embodiments system 100 may be configured to communicate the offloadability information between CN 160 and UE 102 via NAS signaling, e.g., as described below.

In some demonstrative embodiments, MME 162 may be configured to determine the offloadability information, e.g., as described below.

In some demonstrative embodiments, MME 162 may include an offloadability determination module 168 to determine the offloadability information, e.g., as described below.

In some demonstrative embodiments, offloadability determination module 168 may include or may be implemented using suitable circuitry, e.g., controller circuitry, scheduler circuitry, processor circuitry, memory circuitry, and/or any other circuitry, which may be configured to perform at least part of the functionality of module 168. Additionally or alternatively, one or more functionalities of module 168 may be implemented by logic, which may be executed by a machine and/or one or more processors, e.g., as described below.

In some demonstrative embodiments, MME 162 may be configured to have knowledge of whether or not traffic flowing on a given PDN connection is offloadable to WLAN.

In some demonstrative embodiments, offloadability-determination module 145 may determine the offloadability of a PDN connection, for example, based on an APN to which the PDN connection belongs.

In some demonstrative embodiments, MME 162 may be configured to determine the offloadability of a PDN connection, for example, based on a list of offloadable APNs, e.g., which may be received from HSS 161. For example, MME 162 may determine if the PDN connection is offloadable or not, e.g., based on comparing an APN of the PDN connection with the list of offloadable APNs.

In some demonstrative embodiments, HSS interface 166 may receive APN offloadability information from HSS 161. The APN offloadability information may include, for example, information to indicate one or more offloadable APNs, which are allowed for WLAN offloading.

In some demonstrative embodiments, HSS interface 166 may receive APN offloadability information from HSS 161, for example, as part of an attach procedure, e.g., upon establishment of the PDN connection.

In some demonstrative embodiments, offloadability-determination module 168 may be configured to determine, based on the APN offloadability information, the PDN offloadability information corresponding to one or more PDN connections of a UE 102, e.g., as described below. The PDN offloadability information may indicate, for example, which PDN connection of the one or more PDN connections of UE 102 is able to be offloaded to the WLAN and/or which PDN connection of the one or more PDN connections of UE 102 is not to be offloaded to the WLAN, e.g., as described above.

In other embodiments, MME 162 may be pre-configured with the list of offloadable APNs.

In some demonstrative embodiments, eNB interface 164 may send the PDN offloadability information to UE 102 via eNB 104, e.g., as described below.

In some demonstrative embodiments, MME 162 may send the PDN offloadability information to UE 102 as part of a Notification procedure, e.g., using a NAS notification message. For example, eNB interface 164 may send to UE 102 a NAS notification message corresponding to a PDN connection. The NAS notification message may include a notification indicator information Element (IE) including an indication that the PDN connection is offloadable or not.

In some demonstrative embodiments, MME 162 may send the PDN offloadability information to UE 102 as part of an EPS Session Management (ESM) information request procedure, e.g., using a NAS ESM information request message. For example, eNB interface 164 may send to UE 102 a NAS ESM information request message corresponding to a PDN connection. The NAS ESM information request message may include an indication that the PDN connection is offloadable or not.

In some demonstrative embodiments, MME 162 may be configured to provide the PDN offloadability information to UE 102, for example, even if RAN 119 does not support interworking with the WLAN.

Figure 3:
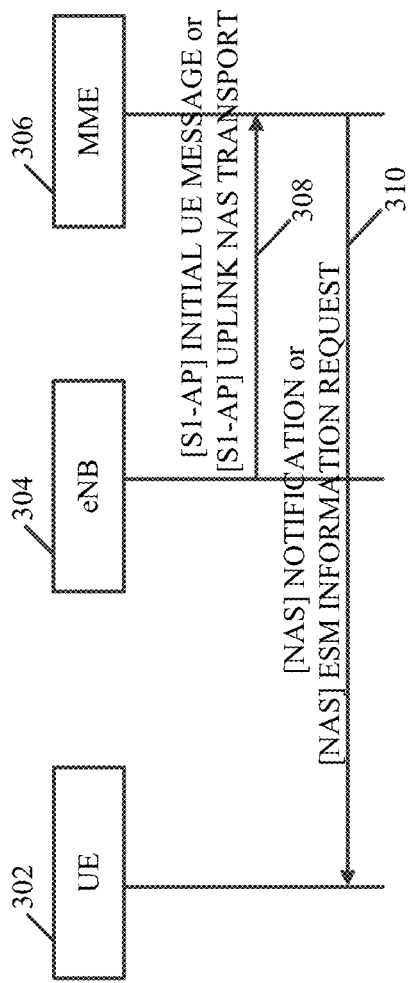
FIG. 3 is a schematic illustration of a sequence diagram of operations performed by a UE, an evolved Node B (eNB), and a Mobility Management Entity (MME), in accordance with some demonstrative embodiments.

FIG. 3 is a schematic illustration of a sequence diagram of operations performed by a UE 302, an eNB 304, and a MME 306, in accordance with some demonstrative embodiments. For example, UE 302 may perform the functionality of UE 102 (FIG. 1), eNB 304 may perform the functionality of eNB 104 (FIG. 1), and/or MME 306 may perform the functionality of MME 162 (FIG. 1).

In some demonstrative embodiments, eNB 304 may send to MME 306 an indication 308 to indicate that eNB 304 supports interworking with a WLAN, e.g., 3GPP-WLAN interworking.

In some demonstrative embodiments, eNB 304 may send indication 308, for example, as part of one or more S1AP messages. For example, eNB 304 may send indication 308, for example, as part of one or more S1AP INITIAL UE messages and/or as part of one or more S1AP UPLINK NAS TRANSPORT messages. In one example, eNB 304 may send indication 308 as part of every S1AP INITIAL UE message and as part of every S1AP UPLINK NAS TRANSPORT message sent to MME 306.

In some demonstrative embodiments, eNB 304 may send to MME 306 an indication to indicate that UE 302 supports interworking with a WLAN, e.g., 3GPP-WLAN interworking, for example, as part of the SLAP INITIAL UE and/or SLAP UPLINK NAS TRANSPORT messages.

In some demonstrative embodiments, MME 306 may select to trigger sending a signaling message 310 including PDN offloadability information 310 to UE 302, e.g., based on indication 308. For example, MME 306 may trigger signaling message 310, e.g., including a NAS Notification message or a NAS ESM information request message, for example, to inform UE 302 about the traffic offloadability for an underlying PDN connection of UE 302.

Referring back to FIG. 1, in some demonstrative embodiments PGW 173 may be configured to provide the PDN offloadability information to UE 102, e.g., as described below.

In some demonstrative embodiments, PGW 173 may be configured to provide the PDN offloadability to UE 102 via NAS signaling, e.g., as described below.

In some demonstrative embodiments, PGW 173 may be configured to have knowledge of whether or not traffic flowing on a given PDN connection is offloadable to WLAN or not.

In some demonstrative embodiments, PGW 173 may determine the offloadability of a PDN connection, for example, based on an APN to which the PDN connection belongs.

In some demonstrative embodiments, PGW 173 may be configured to determine the offloadability of a PDN connection based on a list of offloadable APNs, e.g., which may be received from HSS 161. For example, PGW 173 may determine if the PDN connection is offloadable or not, e.g., based on comparing an APN of the PDN connection with the list of offloadable APNs.

In some demonstrative embodiments, PGW 173 may receive APN offloadability information from HSS 161, for example, as part of an attach procedure, e.g., upon establishment of the PDN connection.

In some demonstrative embodiments, PGW 173 may be configured to determine, based on the APN offloadability information, the PDN offloadability information corresponding to one or more PDN connections of a UE 102. The PDN offloadability information may indicate, for example, which PDN connection of the one or more PDN connections of UE 102 is able to be offloaded to the WLAN and/or which PDN connection of the one or more PDN connections of UE 102 is not to be offloaded to the WLAN, e.g., as described above.

In other embodiments, PGW 173 may be pre-configured with the list of offloadable APNs.

In some demonstrative embodiments, PGW 173 may send to UE 102 the PDN offloadability information corresponding to a PDN connection, for example, upon establishment of the PDN connection, e.g., as part of an attach procedure, or as part of a UE requested PDN connectivity procedure.

In some demonstrative embodiments, PGW 173 may send to UE 102 a message including a Protocol Configuration Options (PCO) IE including an offloadability parameter corresponding to a PDN connection, e.g., upon establishment of the PDN connection. The offloadability parameter of the PCO IE may be configured to indicate to UE 102 whether the traffic carried on the PDN connection is offloadable to WLAN, e.g., as described below.

In some demonstrative embodiments, PGW 173 may send to UE 102 the PCO IE as part of, for example, a GPRS Tunneling Protocol for the control plane (GTP-C) message, e.g., a GTP-C Create Session Response message, a NAS message, e.g., a NAS PDN Connectivity Accept message, or any other type of message.

In some demonstrative embodiments, PGW 173 may send the PDN offloadability information to UE 102 as part of an element of an "Additional Parameter list" in the PCO IE, e.g., as follows:
0001H (P-CSCF IPv6 Address);
0002H (IM CN Subsystem Signaling Flag);
0003H (DNS Server IPv6 Address);
0004H (Policy Control rejection code);
0005H (Selected Bearer Control Mode;
0006H (Reserved);
0007H (DSMIPv6 Home Agent Address);
0008H (DSMIPv6 Home Network Prefix);
0009H (DSMIPv6 IPv4 Home Agent Address);
000AH (Reserved);
000BH (Reserved);
000CH (P-CSCF IPv4 Address);
000DH (DNS Server IPv4 Address);
000EH (MSISDN);
000FH (IFOM-Support);
0010H (IPv4 Link MTU);
0011H (Network support of Local address in TFT indicator); and
FF00H to FFFFH reserved for operator specific use;
0012H (Offloadable traffic).

For example, when included in a PCO IE corresponding to a PDN connection, the element "0012H (Offloadable traffic)" may indicate whether or not the PDN connection is offloadable to WLAN.

In some demonstrative embodiments, the PDN offloadability information may be provided to UE 102 via RRC signaling, from example, by eNB 104, e.g., as described below.

In some demonstrative embodiments, CN 160 may be configured to provide to eNB 104 information indicating which bearers, e.g., Data Radio Bearers (DRBs), may be offloaded to WLAN, e.g., as described below.

In some demonstrative embodiments, eNB 104 may maintain a mapping of DRBs to Radio Access bearers, e.g., to EUTRAN Radio Access Bearers (E-RABs).

In some demonstrative embodiments, CN 160 may be configured to provide to UE 104 bearer offloadability information to indicate, for example, which E-RABs are offloadable to WLAN and/or which E-RABs are not offloadable to WLAN.

In some demonstrative embodiments, offloadability determination module 168 may be configured to determine which E-RABs are offloadable to WLAN and/or which E-RABs are not offloadable to WLAN, for example, based on the APN offloadability information, e.g., as described above.

In some demonstrative embodiments, MME 162 may send the bearer offloadability information to eNB 104, e.g., via eNB interface 164.

In some demonstrative embodiments, MME 162 may send the bearer offloadability information to eNB 104 as part of a S1Ap message, for example, as part of an E-RAB Setup Request message, an E-RAB Modify Request message, and/or any other S1AP message.

In one example, the E-RAB Setup Request message may include the bearer offloadability information as part of a dedicated IE ("WLAN offloadable flag"), e.g., as follows:
E-RAB Setup Request
This message is sent by the MME and is used to request the eNB to assign resources on Uu and S1 for one or several E-RABs.
Direction: MME→eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item | | 1 . . . <maxnoof E-RABs> | | | EACH | reject |

| IEs | | | | | | |
|---|---|---|---|---|---|---|
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | EPC TEID. | — | |
| >>NAS-PDU | M | | 9.2.3.5 | | — | |
| >>Correlation ID | O | | 9.2.1.80 | | YES | ignore |
| >>WLAN offloadable flag | O | | | This flag indicates whether this E-RAB may be offloaded to WLAN. | | |

| Range bound | Explanation |
|---|---|
| maxnoofE-RABs | Maximum no. of E-RAB allowed towards one UE, the maximum value is 256. |

In some demonstrative embodiments, eNB 104 may receive the bearer offloadability information from MME 162, and may determine which DRB may be offloadable to WLAN, e.g., based on the bearer offloadability information.

In some demonstrative embodiments, eNB 104 may send an RRC signaling message to UE 102 to indicate which bearers may be offloaded to WLAN. The RRC signaling message may include, for example, a RRCConnectionSetup message, a RRCConnectionReconfiguration message, and/or any other RRC message.

In one example, eNB 104 may send to UE 102 a RRCConnectionSetup message including a list of DRB identifiers, e.g., in the form of a DRB-ToWLANOffloadList, to indicate which DRBs may be offloaded to WLAN, e.g., as follows:

| RRCConnectionSetup message |
|---|
| ```
-- ASN1START
RRCConnectionSetup ::=                    SEQUENCE {
    rrc-TransactionIdentifier         RRC-TransactionIdentifier,
    criticalExtensions                CHOICE {
        c1                                    CHOICE {
            rrcConnectionSetup-r8             RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture          SEQUENCE { }
    }
}
RRCConnectionSetup-r8-IEs ::=             SEQUENCE {
    radioResourceConfigDedicated          RadioResourceConfigDedicated,
    nonCriticalExtension                  RRCConnectionSetup-v8a0-IEs
    OPTIONAL
}
RRCConnectionSetup-v8a0-IEs ::= SEQUENCE {
    lateNonCriticalExtension          OCTET STRING
    OPTIONAL,          -- Need OP
    nonCriticalExtension                      RRCConnectionSetup-v1200-IEs
                                          OPTIONAL -- Need OP
}
RRCConnectionSetup-v1200-IEs ::= SEQUENCE {
    drb-ToWLANOffloadList         DRB-ToWLANOffloadList OPTIONAL    -- Need OP
    nonCriticalExtension              SEQUENCE { }       OPTIONAL    --
Need OP
}
DRB-ToWLANOffloadList ::=                 SEQUENCE (SIZE (1..maxDRB)) OF
DRB-ToWLANOffload
``` |

| RRCConnectionSetup message |
| --- |
| DRB-ToAddMod ::= SEQUENCE {<br>    drb-Identity                          DRB-Identity,<br>    nonCriticalExtension          SEQUENCE { }         OPTIONAL<br>    -- Need OP<br>}<br>-- ASN1STOP |

In some demonstrative embodiments, UE 102 may receive the RRC signaling message from eNB 104, and controller 145 may determine which PDN may be offloadable, e.g., based on the offloadable bearers indicated by the RRC message.

In some demonstrative embodiments, controller 145 may determine with respect to a DRB indicated by the RRC message, which PDN connection and APN the DRB belongs to, and controller 145 may steer traffic of all PDN connections belonging to the APN to or from the WLAN.

In some demonstrative embodiments, controller 145 may store the PDN offloadability information, and controller 145 may use the PDN offloadability information, e.g., even when UE 102 is at an Idle mode.

In some demonstrative embodiments, the APN offloadability information regarding, which APNs are offloadable to WLAN may be pre-provisioned in UE 102, for example, using an OMA-DM procedure, or any other procedure. According to these embodiments, controller 145 may be able to determine which PDN connection is offloadable or not based on the pre-provisioned APN offloadability information.

Figure 4:
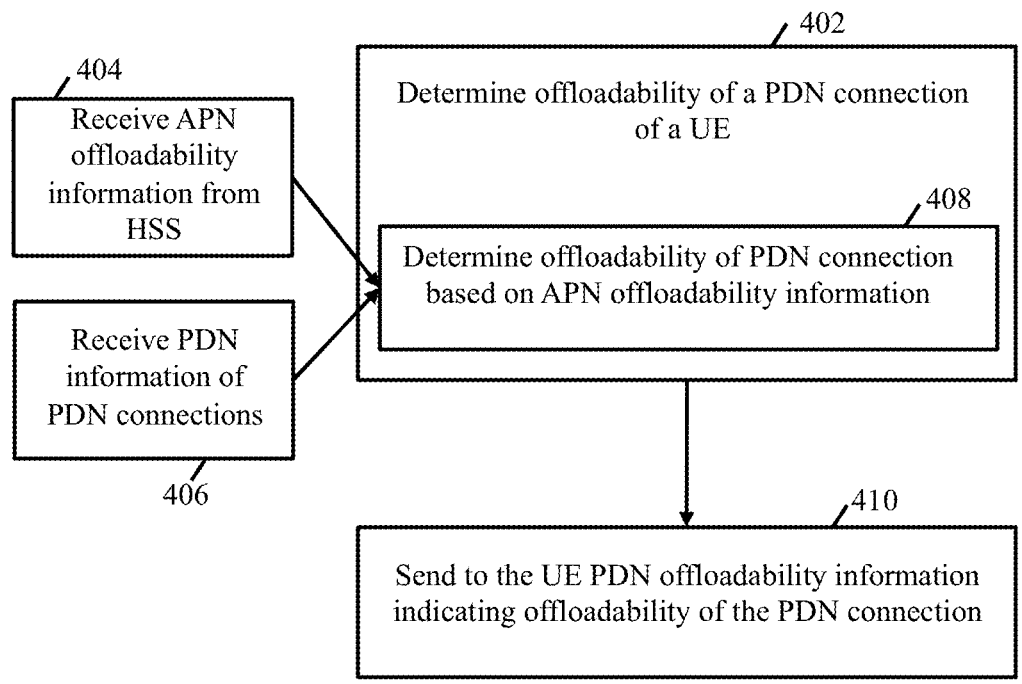
FIG. 4 is a schematic flow-chart illustration of a method of providing offloadability information to a UE, in accordance with some demonstrative embodiments.

FIG. 4 is a schematic flow-chart illustration of a method of providing offloadability information to a UE, in accordance with some demonstrative embodiments. In some demonstrative embodiments, one or more operations of the method of FIG. 4 may be performed by a CN element, for example, an MME, e.g., MME 162 (FIG. 1).

As indicated at block 402, the method may include determining an offloadability of a PDN connection of one or more PDN connection of a UE. For example, offloadability-determination module 168 (FIG. 1) may determine the PDN offloadability information corresponding to one or more PDN connections of UE 102 (FIG. 1), e.g., as described above.

In some demonstrative embodiments, determining the offloadability of the PDN connection may include determining the offloadability of the PDN based an offloadability of an APN corresponding to the PDN connection, e.g., as described below.

As indicated at block 404, the method may include receiving APN offloadability information from an HSS, the APN offloadability information to indicate one or more offloadable APNs, which are allowed for WLAN offloading. For example, HSS interface 1666 (FIG. 1) may receive the APN offloadability information from HSS 161 (FIG. 1), e.g., as described above.

As indicated at block 406, the method may include receiving PDN information of the one or more PDN connections of the UE. For example, MME 162 (FIG. 1) may receive the PDN information corresponding to the one or more connections of UE 102 (FIG. 1), e.g., as described above.

As indicated at block 408, the method may include determining the offloadability of the PDN connection, based on the APN offloadability information. For example, offloadability-determination module 168 (FIG. 1) may determine the PDN offloadability information corresponding to the one or more PDN connections of UE 102 (FIG. 1) based on the APN offloadability information, e.g., as described above.

As indicated at block 410, the method may include sending to the UE PDN offloadability information indicating the offloadability of the PDN connection. For example, eNB interface 164 (FIG. 1) may send the PDN offloadability information to UE 102 (FIG. 1) via eNB 104 (FIG. 1), e.g., as described above.

Figure 5:
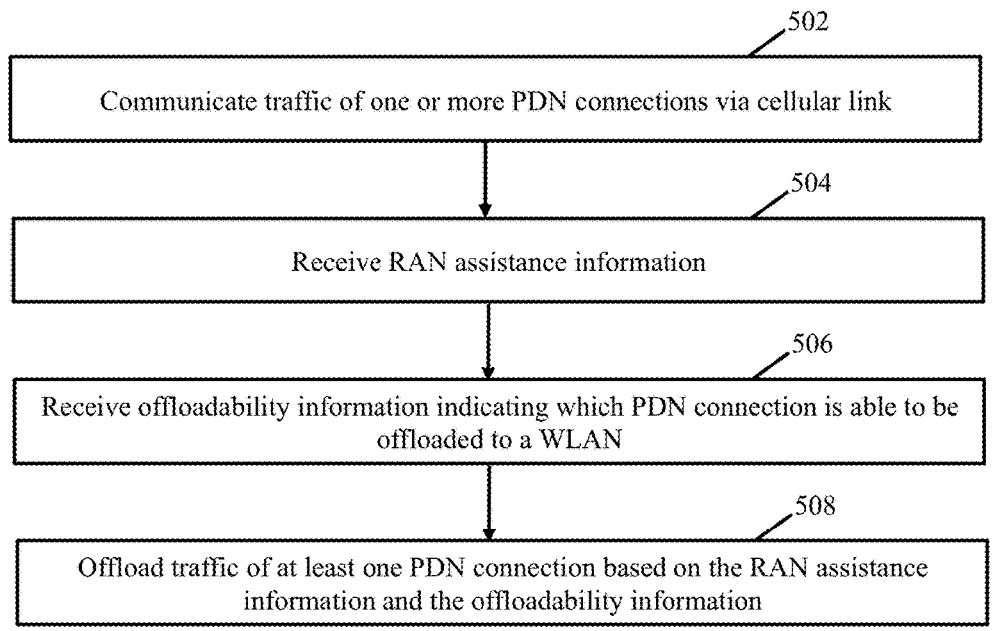
FIG. 5 is a schematic flow-chart illustration of a method of UE-centric access network selection, in accordance with some demonstrative embodiments.

Reference is made to FIG. 5, which schematically illustrates a method of UE-centric access network selection, in accordance with some demonstrative embodiments. In some embodiments, one or more of the operations of the method of FIG. 5 may be performed by a wireless communication system e.g., system 100 (FIG. 1); and/or a wireless communication device, e.g., UE 102 (FIG. 1).

As indicated at block 502, the method may include communicating traffic of one or more PDN connections via a cellular link. For example, cellular TRx 146 (FIG. 1) may communicate traffic of one or more PDN connections via a cellular link with RAN 119 (FIG. 1), e.g., as described above.

As indicated at block 504, the method may include receiving RAN assistance information. For example, cellular TRx 146 (FIG. 1) may receive RAN assistance information from RAN 119 (FIG. 1), e.g., as described above.

As indicated at block 506, the method may include receiving offloadability information indicating which PDN connection of the one or more PDN connections is able to be offloaded to a WLAN. For example, cellular TRx 146 (FIG. 1) may receive the PDN offloadability information from RAN 119 (FIG. 1), e.g., as described above.

As indicated at block 508, the method may include offloading traffic of at least one PDN connection to the WLAN based on the RAN assistance information and the offloadability information. For example, controller 145 (FIG. 1) may offload traffic of at least one PDN connection to the WLAN based on the RAN assistance information and the PDN offloadability information, e.g., as described above.

Figure 6:
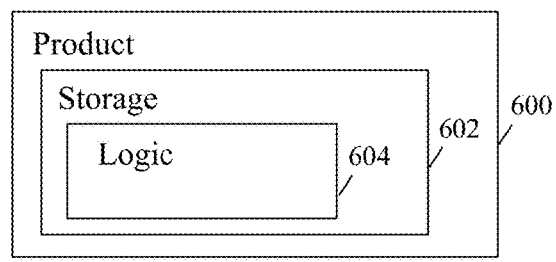
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of UE 102 (FIG. 1), eNB 104 (FIG. 1), node B 196 (FIG. 1), MME 162 (FIG. 1), controller 145 (FIG. 1), and/or offloadability determination module 168 (FIG. 1), and/or to perform one or more operations of the method of FIGS. 4 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a User Equipment (UE) comprising a Wireless Local Area Network (WLAN) transceiver to communicate with a WLAN; a cellular transceiver to communicate via a cellular link traffic of one or more Packet Data Network (PDN) connections, the cellular transceiver to receive Radio Access Network (RAN) assistance information, and offloadability information indicating which PDN connection of the one or more PDN connections is able to be offloaded to the WLAN; and control circuitry to offload traffic of at least one PDN connection to the WLAN based on the RAN assistance information and the offloadability information.

Example 2 includes the subject matter of Example 1, and optionally, wherein the offloadability information indicates for each PDN connection, whether or not the PDN connection is offloadable to the WLAN.

Example 3 includes the subject matter of Example 1 or 2, and optionally, wherein the cellular transceiver is to receive the RAN assistance information via Radio Resource Control (RRC) signaling.

Example 4 includes the subject matter of any one of Examples 1-3, and optionally, wherein the cellular transceiver is to receive the offloadability information from a Mobility Management Entity (MME).

Example 5 includes the subject matter of Example 4, and optionally, wherein the cellular transceiver is to receive the offloadability information via Non-Access Stratum (NAS) signaling.

Example 6 includes the subject matter of Example 5, and optionally, wherein the cellular transceiver is to receive the offloadability information in a NAS notification message.

Example 7 includes the subject matter of Example 5, and optionally, wherein the cellular transceiver is to receive the offloadability information in an Evolved Packet Switch (EPS) Session Management (ESM) information message.

Example 8 includes the subject matter of any one of Examples 1-7, and optionally, wherein the RAN assistance information comprises offload preference information.

Example 9 includes the subject matter of any one of Examples 1-8, and optionally, wherein the RAN assistance information comprises one or more signal strength thresholds.

Example 10 includes the subject matter of any one of Examples 1-9, and optionally, comprising one or more antennas, a memory and a processor.

Example 11 includes a Mobility Management Entity (MME) comprising a Home Subscriber Server (HSS) interface to receive Access Point Name (APN) offloadability information from an HSS, the APN offloadability information to indicate one or more offloadable APNs, which are allowed for Wireless Local Area Network (WLAN) offloading; offloadability-determination circuitry configured to determine, based on the APN offloadability information, Packet Data Network (PDN) offloadability information corresponding to one or more PDN connections of a User Equipment (UE), the PDN offloadability information indicating which PDN connection of the one or more PDN connections is able to be offloaded to a WLAN; and an Evolved Node B (eNB) interface to send the PDN offloadability information to the UE via an Evolved Node B (eNB).

Example 12 includes the subject matter of Example 11, and optionally, wherein the APN offloadability information includes a list of offloadable APNs.

Example 13 includes the subject matter of Example 11 or 12, and optionally, wherein the PDN offloadability information indicates for each PDN connection, whether or not the PDN connection is offloadable to the WLAN.

Example 14 includes the subject matter of any one of Examples 11-13, and optionally, wherein the eNB interface is to send the PDN offloadability information to the UE via Non-Access Stratum (NAS) signaling.

Example 15 includes the subject matter of Example 14, and optionally, wherein the eNB interface is to send the PDN offloadability information to the UE in a NAS notification message.

Example 16 includes the subject matter of Example 14, and optionally, wherein the eNB interface is to send the PDN offloadability information to the UE in an Evolved Packet Switch (EPS) Session Management (ESM) information message.

Example 17 includes the subject matter of any one of Examples 11-16, and optionally, comprising a memory, and a processor.

Example 18 includes a wireless communication system including at least one User Equipment (UE), the UE comprising one or more antennas; a memory; a processor; an input unit; and output unit; a Wireless Local Area Network (WLAN) transceiver to communicate with a WLAN; a cellular transceiver to communicate via a cellular link traffic of one or more Packet Data Network (PDN) connections, the cellular transceiver to receive Radio Access Network (RAN) assistance information, and offloadability information indicating which PDN connection of the one or more PDN connections is able to be offloaded to the WLAN; and control circuitry to offload traffic of at least one PDN connection to the WLAN based on the RAN assistance information and the offloadability information.

Example 19 includes the subject matter of Example 18, and optionally, wherein the offloadability information indicates for each PDN connection, whether or not the PDN connection is offloadable to the WLAN.

Example 20 includes the subject matter of Example 18 or 19, and optionally, wherein the cellular transceiver is to receive the RAN assistance information via Radio Resource Control (RRC) signaling.

Example 21 includes the subject matter of any one of Examples 18-20, and optionally, wherein the cellular transceiver is to receive the offloadability information from a Mobility Management Entity (MME).

Example 22 includes the subject matter of Example 21, and optionally, wherein the cellular transceiver is to receive the offloadability information via Non-Access Stratum (NAS) signaling.

Example 23 includes the subject matter of Example 22, and optionally, wherein the cellular transceiver is to receive the offloadability information in a NAS notification message.

Example 24 includes the subject matter of Example 22, and optionally, wherein the cellular transceiver is to receive the offloadability information in an Evolved Packet Switch (EPS) Session Management (ESM) information message.

Example 25 includes the subject matter of any one of Examples 18-24, and optionally, wherein the RAN assistance information comprises offload preference information.

Example 26 includes the subject matter of any one of Examples 18-25, and optionally, wherein the RAN assistance information comprises one or more signal strength thresholds.

Example 27 includes a Core Network (CN) comprising a Mobility Management Entity (MME), the MME comprising a memory; a processor; a Home Subscriber Server (HSS) interface to receive Access Point Name (APN) offloadability information from an HSS, the APN offloadability information to indicate one or more offloadable APNs, which are allowed for Wireless Local Area Network (WLAN) offloading; an offloadability-determination module configured to determine, based on the APN offloadability information, Packet Data Network (PDN) offloadability information corresponding to one or more PDN connections of a User Equipment (UE), the PDN offloadability information indicating which PDN connection of the one or more PDN connections is able to be offloaded to a WLAN; and an Evolved Node B (eNB) interface to send the PDN offloadability information to the UE via an Evolved Node B (eNB).

Example 28 includes the subject matter of Example 27, and optionally, wherein the APN offloadability information includes a list of offloadable APNs.

Example 29 includes the subject matter of Example 27 or 28, and optionally, wherein the PDN offloadability information indicates for each PDN connection, whether or not the PDN connection is offloadable to the WLAN.

Example 30 includes the subject matter of any one of Examples 27-29, and optionally, wherein the eNB interface is to send the PDN offloadability information to the UE via Non-Access Stratum (NAS) signaling.

Example 31 includes the subject matter of Example 30, and optionally, wherein the eNB interface is to send the PDN offloadability information to the UE in a NAS notification message.

Example 32 includes the subject matter of Example 30, and optionally, wherein the eNB interface is to send the PDN offloadability information to the UE in an Evolved Packet Switch (EPS) Session Management (ESM) information message.

Example 33 includes a method to be performed by a User Equipment (UE), the method comprising communicating traffic of one or more Packet Data Network (PDN) connections via a cellular link; receiving Radio Access Network (RAN) assistance information, and offloadability information indicating which PDN connection of the one or more PDN connections is able to be offloaded to a Wireless Local Area Network (WLAN); and offloading traffic of at least one PDN connection to the WLAN based on the RAN assistance information and the offloadability information.

Example 34 includes the subject matter of Example 33, and optionally, wherein the offloadability information indicates for each PDN connection, whether or not the PDN connection is offloadable to the WLAN.

Example 35 includes the subject matter of Example 33 or 34, and optionally, comprising receiving the RAN assistance information via Radio Resource Control (RRC) signaling.

Example 36 includes the subject matter of any one of Examples 33-35, and optionally, comprising receiving the offloadability information from a Mobility Management Entity (MME).

Example 37 includes the subject matter of Example 36, and optionally, comprising receiving the offloadability information via Non-Access Stratum (NAS) signaling.

Example 38 includes the subject matter of Example 37, and optionally, comprising receiving the offloadability information in a NAS notification message.

Example 39 includes the subject matter of Example 37, and optionally, comprising receiving the offloadability information in an Evolved Packet Switch (EPS) Session Management (ESM) information message.

Example 40 includes the subject matter of any one of Examples 33-39, and optionally, wherein the RAN assistance information comprises offload preference information.

Example 41 includes the subject matter of any one of Examples 33-40, and optionally, wherein the RAN assistance information comprises one or more signal strength thresholds.

Example 42 includes a method to be performed at a Mobility Management Entity (MME), the method comprising receiving Access Point Name (APN) offloadability information from a Home Subscriber Server (HSS), the APN offloadability information to indicate one or more offloadable APNs, which are allowed for Wireless Local Area Network (WLAN) offloading; receiving Packet Data Network (PDN) information of one or more PDN connections of a User Equipment (UE); determining an offloadability of a PDN connection of the one or more PDN connection, based on the APN offloadability information; and sending to the UE PDN offloadability information indicating the offloadability of the PDN connection.

Example 43 includes the subject matter of Example 42, and optionally, wherein the APN offloadability information includes a list of offloadable APNs.

Example 44 includes the subject matter of Example 42 or 43, and optionally, wherein the PDN offloadability information indicates for each PDN connection, whether or not the PDN connection is offloadable to the WLAN.

Example 45 includes the subject matter of any one of Examples 42-44, and optionally, comprising sending the PDN offloadability information to the UE via Non-Access Stratum (NAS) signaling.

Example 46 includes the subject matter of Example 45, and optionally, comprising sending the PDN offloadability information to the UE in a NAS notification message.

Example 47 includes the subject matter of Example 45, and optionally, comprising sending the PDN offloadability information to the UE in an Evolved Packet Switch (EPS) Session Management (ESM) information message.

Example 48 includes a product including one or more tangible computer-readable non-transitory storage media comprising computer-executable instructions operable to, when executed by at least one computer processor, enable the at least one computer processor to implement a method at a User Equipment (UE), the method comprising communicating traffic of one or more Packet Data Network (PDN) connections via a cellular link; receiving Radio Access Network (RAN) assistance information, and offloadability information indicating which PDN connection of the one or more PDN connections is able to be offloaded to a Wireless Local Area Network (WLAN); and offloading traffic of at least one PDN connection to the WLAN based on the RAN assistance information and the offloadability information.

Example 49 includes the subject matter of Example 48, and optionally, wherein the offloadability information indicates for each PDN connection, whether or not the PDN connection is offloadable to the WLAN.

Example 50 includes the subject matter of Example 48 or 49, and optionally, wherein the method comprises receiving the RAN assistance information via Radio Resource Control (RRC) signaling.

Example 51 includes the subject matter of any one of Examples 48-50, and optionally, wherein the method comprises receiving the offloadability information from a Mobility Management Entity (MME).

Example 52 includes the subject matter of Example 51, and optionally, wherein the method comprises receiving the offloadability information via Non-Access Stratum (NAS) signaling.

Example 53 includes the subject matter of Example 52, and optionally, wherein the method comprises receiving the offloadability information in a NAS notification message.

Example 54 includes the subject matter of Example 52, and optionally, wherein the method comprises receiving the offloadability information in an Evolved Packet Switch (EPS) Session Management (ESM) information message.

Example 55 includes the subject matter of any one of Examples 48-54, and optionally, wherein the RAN assistance information comprises offload preference information.

Example 56 includes the subject matter of any one of Examples 48-55, and optionally, wherein the RAN assistance information comprises one or more signal strength thresholds.

Example 57 includes a product including one or more tangible computer-readable non-transitory storage media comprising computer-executable instructions operable to, when executed by at least one computer processor, enable the at least one computer processor to implement a method at a Mobility Management Entity (MME), the method comprising receiving Access Point Name (APN) offloadability information from a Home Subscriber Server (HSS), the APN offloadability information to indicate one or more offloadable APNs, which are allowed for Wireless Local Area Network (WLAN) offloading; receiving Packet Data Network (PDN) information of one or more PDN connections of a User Equipment (UE); determining an offloadability of a PDN connection of the one or more PDN connection, based on the APN offloadability information; and sending to the UE PDN offloadability information indicating the offloadability of the PDN connection.

Example 58 includes the subject matter of Example 57, and optionally, wherein the APN offloadability information includes a list of offloadable APNs.

Example 59 includes the subject matter of Example 57 or 58, and optionally, wherein the PDN offloadability information indicates for each PDN connection, whether or not the PDN connection is offloadable to the WLAN.

Example 60 includes the subject matter of any one of Examples 57-59, and optionally, wherein the method comprises sending the PDN offloadability information to the UE via Non-Access Stratum (NAS) signaling.

Example 61 includes the subject matter of Example 60, and optionally, wherein the method comprises sending the PDN offloadability information to the UE in a NAS notification message.

Example 62 includes the subject matter of Example 60, and optionally, wherein the method comprises sending the PDN offloadability information to the UE in an Evolved Packet Switch (EPS) Session Management (ESM) information message.

Example 63 includes an apparatus of wireless communication, the apparatus comprising means for communicating traffic of one or more Packet Data Network (PDN) connections via a cellular link; means for receiving Radio Access Network (RAN) assistance information, and offloadability information indicating which PDN connection of the one or more PDN connections is able to be offloaded to a Wireless Local Area Network (WLAN); and means for offloading traffic of at least one PDN connection to the WLAN based on the RAN assistance information and the offloadability information.

Example 64 includes the subject matter of Example 63, and optionally, wherein the offloadability information indicates for each PDN connection, whether or not the PDN connection is offloadable to the WLAN.

Example 65 includes the subject matter of Example 63 or 64, and optionally, comprising means for receiving the RAN assistance information via Radio Resource Control (RRC) signaling.

Example 66 includes the subject matter of any one of Examples 63-65, and optionally, comprising means for receiving the offloadability information from a Mobility Management Entity (MME).

Example 67 includes the subject matter of Example 66, and optionally, comprising means for receiving the offloadability information via Non-Access Stratum (NAS) signaling.

Example 68 includes the subject matter of Example 67, and optionally, comprising means for receiving the offloadability information in a NAS notification message.

Example 69 includes the subject matter of Example 67, and optionally, comprising means for receiving the offloadability information in an Evolved Packet Switch (EPS) Session Management (ESM) information message.

Example 70 includes the subject matter of any one of Examples 63-69, and optionally, wherein the RAN assistance information comprises offload preference information.

Example 71 includes the subject matter of any one of Examples 63-70, and optionally, wherein the RAN assistance information comprises one or more signal strength thresholds.

Example 72 includes an apparatus of mobility management, the apparatus comprising means for receiving Access Point Name (APN) offloadability information from a Home Subscriber Server (HSS), the APN offloadability information to indicate one or more offloadable APNs, which are allowed for Wireless Local Area Network (WLAN) offloading; means for receiving Packet Data Network (PDN) information of one or more PDN connections of a User Equipment (UE); means for determining an offloadability of a PDN connection of the one or more PDN connection, based on the APN offloadability information; and means for sending to the UE PDN offloadability information indicating the offloadability of the PDN connection.

Example 73 includes the subject matter of Example 72, and optionally, wherein the APN offloadability information includes a list of offloadable APNs.

Example 74 includes the subject matter of Example 72 or 73, and optionally, wherein the PDN offloadability information indicates for each PDN connection, whether or not the PDN connection is offloadable to the WLAN.

Example 75 includes the subject matter of any one of Examples 72-74, and optionally, comprising means for sending the PDN offloadability information to the UE via Non-Access Stratum (NAS) signaling.

Example 76 includes the subject matter of Example 75, and optionally, comprising means for sending the PDN offloadability information to the UE in a NAS notification message.

Example 77 includes the subject matter of Example 75, and optionally, comprising means for sending the PDN offloadability information to the UE in an Evolved Packet Switch (EPS) Session Management (ESM) information message.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A User Equipment (UE) comprising:
a Wireless Local Area Network (WLAN) transceiver to communicate with a WLAN;
a cellular transceiver to communicate via a cellular link traffic of one or more Packet Data Network (PDN) connections, the cellular transceiver to receive Radio Access Network (RAN) assistance information, and offloadability information indicating which PDN connection of the one or more PDN connections is to be allowed to be offloaded to the WLAN and which PDN connection is not to be allowed to be offloaded to the WLAN, the cellular transceiver to receive, in response to establishment of a PDN connection of the UE, a WLAN offloadability indication to indicate whether the established PDN connection is offloadable or not offloadable to the WLAN; and
control circuitry to offload traffic of at least one PDN connection to the WLAN based on the RAN assistance information and the offloadability information.

2. The UE of claim 1, wherein said offloadability information indicates for each PDN connection, whether or not the PDN connection is offloadable to the WLAN.

3. The UE of claim 1, wherein said cellular transceiver is to receive the RAN assistance information via Radio Resource Control (RRC) signaling.

4. The UE of claim 1, wherein said cellular transceiver is to receive the offloadability information from a Mobility Management Entity (MME).

5. The UE of claim 4, wherein said cellular transceiver is to receive the offloadability information via Non-Access Stratum (NAS) signaling.

6. The UE of claim 5, wherein said cellular transceiver is to receive the offloadability information in a NAS notification message.

7. The UE of claim 5, wherein said cellular transceiver is to receive the offloadability information in an Evolved Packet Switch (EPS) Session Management (ESM) information message.

8. The UE of claim 1, wherein the RAN assistance information comprises offload preference information.

9. The UE of claim 1, wherein the RAN assistance information comprises one or more signal strength thresholds.

10. The UE of claim 1 comprising one or more antennas, a memory and a processor.

11. A Mobility Management Entity (MME) comprising:
a Home Subscriber Server (HSS) interface to receive Access Point Name (APN) offloadability information from an HSS, the APN offloadability information to indicate one or more offloadable APNs, which are allowed for Wireless Local Area Network (WLAN) offloading, the APN offloadability information to indicate, for an APN, whether WLAN offload is to be allowable or not allowable for the APN;
offloadability-determination circuitry configured to determine, based at least on the APN offloadability information, Packet Data Network (PDN) offloadability information corresponding to one or more PDN connections of a User Equipment (UE), the PDN offloadability information indicating which PDN connection of the one or more PDN connections is to be allowed to be offloaded to a WLAN and which PDN connection is not to be allowed to be offloaded to the WLAN; and
an Evolved Node B (eNB) interface to, in response to establishment of a PDN connection of the UE, send the PDN offloadability information to the UE via an Evolved Node B (eNB), the PDN offloadability information to indicate whether the established PDN connection is offloadable or not offloadable to the WLAN.

12. The MME of claim 11, wherein said APN offloadability information includes a list of offloadable APNs.

13. The MME of claim 11, wherein said PDN offloadability information indicates for each PDN connection, whether or not the PDN connection is offloadable to the WLAN.

14. The MME of claim 11, wherein the eNB interface is to send the PDN offloadability information to the UE via Non-Access Stratum (NAS) signaling.

15. The MME of claim 14, wherein said eNB interface is to send the PDN offloadability information to the UE in a NAS notification message.

16. The MME of claim 14, wherein said eNB interface is to send the PDN offloadability information to the UE in an Evolved Packet Switch (EPS) Session Management (ESM) information message.

17. The MME of claim 11 comprising a memory, and a processor.

18. A method to be performed at a Mobility Management Entity (MME), the method comprising:
    receiving Access Point Name (APN) offloadability information from a Home Subscriber Server (HSS), the APN offloadability information to indicate one or more offloadable APNs, which are allowed for Wireless Local Area Network (WLAN) offloading, the APN offloadability information to indicate, for an APN, whether WLAN offload is to be allowable or not allowable for the APN;
    receiving Packet Data Network (PDN) information of one or more PDN connections of a User Equipment (UE);
    determining PDN offloadability information to indicate an offloadability of a PDN connection of the one or more PDN connections, based at least on the APN offloadability information, the PDN offloadability information to indicate which PDN connection of the one or more PDN connections is to be allowed to be offloaded to WLAN and which PDN connection is not to be allowed to be offloaded to WLAN; and
    in response to establishment of a PDN connection of the UE, sending to the UE PDN offloadability information corresponding to the established PDN connection indicating whether the established PDN connection is offloadable or not offloadable to the WLAN.

19. The method of claim 18, wherein said APN offloadability information includes a list of offloadable APNs.

20. The method of claim 18 comprising sending the PDN offloadability information to the UE via Non-Access Stratum (NAS) signaling.

21. The method of claim 18 comprising sending the PDN offloadability information to the UE in a NAS notification message.

22. A product including one or more tangible non-transitory computer-readable storage media comprising computer-executable instructions operable to, when executed by at least one computer processor, enable the at least one computer processor to implement operations at a User Equipment (UE), the operations comprising:
    communicating traffic of one or more Packet Data Network (PDN) connections via a cellular link;
    receiving Radio Access Network (RAN) assistance information, and offloadability information indicating which PDN connection of the one or more PDN connections is to be allowed to be offloaded to a Wireless Local Area Network (WLAN) and which PDN connection is not to be allowed to be offloaded to the WLAN;
    receiving, in response to establishment of a PDN connection of the UE, a WLAN offloadability indication to indicate whether the established PDN connection is offloadable or not offloadable to the WLAN; and
    offloading traffic of at least one PDN connection to the WLAN based on the RAN assistance information and the offloadability information.

23. The product of claim 22, wherein said offloadability information indicates for each PDN connection, whether or not the PDN connection is offloadable to the WLAN.

24. The product of claim 22, wherein the operations comprise receiving the offloadability information from a Mobility Management Entity (MME).

25. The product of claim 24, wherein the operations comprise receiving the offloadability information via Non-Access Stratum (NAS) signaling.

* * * * *